United States Patent [19]

Kikuchi et al.

[11] 4,057,525

[45] Nov. 8, 1977

[54] METHODS FOR PREPARING STABLE SILICA SOLS AND INORGANIC COATING COMPOSITIONS

[75] Inventors: Kiyoshi Kikuchi, Hiratsuka; Takeo Okano, Zama; Yukio Terakawa; Akira Nishihara, both of Tokyo, all of Japan

[73] Assignee: Kowa Chemical Industry Ltd., Japan

[21] Appl. No.: 667,141

[22] Filed: Mar. 15, 1976

[30] Foreign Application Priority Data

Mar. 20, 1975 Japan .................................. 50-33879
Nov. 11, 1975 Japan ................................ 50-135294

[51] Int. Cl.² ............................................. C08L 61/28
[52] U.S. Cl. ...................... 260/29.4 R; 260/29.4 UA; 428/502; 428/524; 428/528
[58] Field of Search .................. 260/29.4 UA, 29.4 R, 260/851, 39 SB, 33.4 R

[56] References Cited

U.S. PATENT DOCUMENTS

| | | | |
|---|---|---|---|
| 2,953,534 | 9/1960 | Schneider | 260/29.4 UA |
| 3,069,375 | 12/1962 | Bullitt, Jr. et al. | 260/29.4 UA |
| 3,355,314 | 11/1967 | Gagnon et al. | 260/29.4 UA |

*Primary Examiner*—Theodore E. Pertilla
*Attorney, Agent, or Firm*—McGlew and Tuttle

[57] ABSTRACT

A novel stable silica sol which does not gel even at low temperatures is prepared by adding a di -or polyhydric alcohol having three or more carbon atoms and a water-soluble melamine resin to a silica sol. A novel water-based coating composition which requires only an applying step, not a baking step nor a drying step, in the use is prepared by adding an aggregate or filler and usual additives for coating material to the aforesaid stable silica sol as binder. By adding further a small amount of a synthetic resin emulsion to said binder, an inorganic coating composition containing a smaller amount of organic materials than that in prior products can be obtained. The coating therefrom is excellent in strength and its fire resistance is not lowered.

15 Claims, No Drawings

METHODS FOR PREPARING STABLE SILICA SOLS AND INORGANIC COATING COMPOSITIONS

BACKGROUND OF THE INVENTION

1. Field of the Invention

This invention relates to a method for preparing a stable silica sol as well as to a material-saving, non-polluting, non-flammable inorganic coating composition which is characterized by containing said silica sol as binder and by early developing of the strength of the coating at room temperature.

2. Description of the Prior Art

Products of silica sol which have silica particles having silicate framework as principal ingredient in an amount of 20 – 31% are commercially available at present. These products are frozen at or below 0° C and cannot revert to sols, even after having been thawed, to be unusable. Because of these drawbacks in stability, especially at lower temperatures, their application is limited. Any solution for these problems has been desired.

Various methods are proposed to stabilize a silica sol. As a method for stabilizing by addition of a chemical it is well known to use a volatile nitrogen-containing base having a low molecular weight, such as an organic amine and a quaternary ammonium hydroxide. However, these chemicals increase the pH of a silica sol due to their high basicity. In addition, when the temperature of the sol rises or the water in the sol decreases by evaporation during storage, the added nitrogenous base is concurrently removed due to its volatility and the silica sol is concentrated. As a result, the sol converts to a gel and silica crystals precipitate. These are important drawbacks of said method. Further, a method for stabilizing a silica sol where a water-soluble organic liquid, such as ethylene glycol, is added to a sol has been also known. However, this stabilizing method has a drawback that the resulted sol gels on cooling.

On the other hand, uses of silica sols as coating material have been proposed. For example, when the coating is desired to be reinforced and improved in the case of coating a surface of an inorganic or organic material with a silica sol, methanol is added to an aqueous dispersion of silica particules having a definite surface area. The amount of methanol to be added is within a defined range of molar ratio of methanol to water. Thus-formed silica sol composition is applied onto the surface to form a reinforced coating. In some cases, methanol retained in the coating is burnt immediately after applying to promote forming of improved film. However, the coatings according to these methods have low strengths, and the control of burning operation is difficult to practice.

As method for stabilizing a silica sol is well known a process where an anionic surface active agent is employed to form a colloidal silica. The prepared colloidal silica is mixed with a polyvinyl acetate emulsion. The mixture is used to treat a sheet for photosensitive paper. Thus, the mixture is not for using as binder of coating material. Compositions where a synthetic resin emulsion has been added to a silica sol to increase the binder force are known as binder for coating material. When a water-based coating material containing, as binder, silica hydrosol added with a synthetic resin emulsion is employed, a large amount of said synthetic resin emulsion is required to add, especially in the case of a reinforced coating of 2 mm or more in thickness being desired. In order to prevent the deposition of aggregate and cracking of coating in the course of drying, bentonite is added, together with a large amount of a synthetic resin emulsion. However, this method has a drawback that the resulted coating has a lowered water resistance and a low strength due to the large amount added of bentonite.

THE INVENTION

It is, therefore, one object of the present invention to provide a method for preparing a stable silica sol which does not gel even at low temperature.

Another object of the invention is to provide a novel inorganic coating composition containing silica sol which can form a thick coating.

It is a further object of this invention to provide a novel inorganic coating composition containing silica sol which can form a coating of excellent initial hardness at room temperatures and of excellent fire resistance.

As for the gelation of a silica sol, there are two ways. In one way, silica particles agglomerate and grow to settle. In the other way, the particles form a continuous network and the whole sol converts to a jelly. The formation of silica gel is initiated by mutual binding of colloidal particles in both cases. When such binding continues, a three-dimensional network of siloxane chain is formed. It is also known that the further polymerization proceeds. As a result of studying the infrared spectrums and the X-ray diffraction pattern, the surface structure of silica is recognized as having silanol groups and its characteristics is also elucidated. The interaction between colloidal silica particles in a dispersion is performed by virtue of hydrogen bonding between silanol groups. It is noted that hydroxyl groups of these silanol groups alway adsorb surrounding substances, such as water, alcohol, and synthetic resin emulsions, unless the surface of silica is dehydrated by heating or other treating. Thus, the present inventors remark that water remains by combining with surfacial silanol groups and by being occluded in the network of silica gel, even when a silica gel has been dried. On the basis of these facts is developed this invention which comprises a method for preparing a silica sol stable at low temperatures, a non-flammable inorganic coating composition including said silica sol as binder characterized by early developing of hardness of coating therefrom, and a method for preparing said composition.

Extensive studies are performed by the present inventors for improving the low-temperature and storage stabilities of a silica sol and for forming a coating having a sufficient strength and adhesiveness from said silica sol added with a filler. As a result, the low temperature stability of a silica sol is found to be improved, when triethylene glycol is added to said silica sol. It is ascertained also that this fact is due to the formation of hydrogen bond between a hydroxyl group present on the surface of colloidal silica particle and triethylene glycol which is a dihydric long chain alcohol having more than 3 carbon atoms, rather than merely due to the freezing point depression of the dispersion. Furthermore, it is found that, when a small amount of water-soluble melamine is added to said stabilized silica sol, the hardness of the coating obtained from the coating composition containing such silica sol is improved and the finished surface is hard to crack. When a silica sol is employed as binder for coating material, the structure of network of siloxane bonding in the surface layer of the coating which has cured by way of gelling is different from that in the internal part of the same coating. It is observed by examining the fractured surfaces in adhesion strength tests that said difference of structure is conspicuous in the case when the applied coating is of 2 mm or more in thickness. In consideration of these facts combined with the aforementioned surface structure, the surface effect, and the power to form hydrogen bonds of silica particles, and the adsorptivity of associable silanol group, the following conclusion is drawn. As adsorbate is effective a substance which has a high bonding energy of hydrogen bond. The addition of a substance or substances which have a binding power in excess of the value enough to bind merely mechanically filler particles is effective in making a silica sol suitable for use as binder of a coating composition. Actually, the addition of an ester synthetic resin along with a minute amount of a water-soluble melamine resin is effective. This invention is accomplished on the basis of this technical concept.

According to one aspect of the present invention, there is provided a method for preparing a stable silica sol which is characterized by comprising adding one or more kinds of dihydric long chain alcohol having three or more carbon atoms and a water-soluble melamine resin with or without a synthetic resin emulsion to a silica sol. In another aspect of the present invention, there is provided a method for preparing a coating material, especially suitable for coating an inner or outer wall surface, which comprises blending necessary materials, such as aggregate, filler, water-repellent, thickener, colored pigment and anti-foaming agent, with a stable silica sol of this invention. In a further aspect of the present invention, there is provided an inorganic coating composition which is formed by employing as binder a silica sol stabilized by adding a dihydric alcohol having 3 or more carbon atoms, a small amount of a water-soluble melamine resin and a synthetic resin, and adding 2 – 20 parts by weight of a pigment, an aggregate and a filler per one part by weight of said silica sol in said binder, a suitable amount of a thickener, additives for coating material, such as anti-foaming agent, and water to said stabilized silica sol as binder.

Preferably, the binder of the coating composition contains 2 – 10 parts by weight of a water-soluble melamine resin and 10 – 35 parts by weight of a synthetic resin emulsion having the resin content of 30% per 100 parts by weight of a silica sol having the silica content of 30%.

The term "silica sol" as employed herein means a colloidal solution of polymerized silica in a dispersion medium consisting mainly of water. Preferred commercially available silica sol products contain silica of the order of 20 – 31% and have a pH value of 8 – 11 at 25° C and a viscosity of 10 or less centipoises, the diameter of silica particles being of the order of 10 – 20 m$\mu$.

Useful dihydric alcohols having 3 or more carbon atoms which have a long carbon chain and can form hydrogen bonds with hydroxyl groups present on the surface of colloidal silica to stabilize said silica include propylene glycol, trimethylene glycol, triethylene glycol etc. The amount added of these dihydric alcohol is of more than about 5 parts by weight, preferably 5 – 15 parts by weight, per 100 parts by weight of silica sol which has silica content of 30%.

As water-soluble melamine resin is preferred a stable water-soluble methyl-etherified product of melamine-formaldehyde precondensate which is prepared by the following procedure. Melamine is reacted at low temperature under alkaline condition with formaldehyde to obtain a methylol derivative of high methylol content. This methylol derivative is etherified under weak acidic condition with methanol. The reason why more than 2 parts by weight, preferably 2 – 10 parts by weight, of said water-soluble melamine resin is employed per 100 parts by weight of silica sol is that the tensile strength of the resulted coating is insufficient when an amount less than 2 parts by weight is employed, and the performance of the coating, such as crack resistance, is deteriorated when an amount more than 10 parts by weight is employed.

Preferred synthetic resin emulsion are emulsions of an ester synthetic resin which is prepared by emulsion-polymerizing one or more kinds of monomer selected from the group consisting of vinyl esters, such as vinyl acetate, vinyl propionate, and vinyl sebacate; unsaturated acids, such as acrylic acid, methacrylic acid, fumaric acid, crotonic acid, maleic acid, and itaconic acid; and esters thereof.

In accordance with this invention, the strength and the curing rate of the formed coating can be remarkably enhanced by employing a combination of a synthetic resin specified above and a small amount of a melamine resin in a silica sol, as shown by Table 4, Example 3 described hereinafter.

Accordingly, amounts added of organic materials can be reduced when compared with products of the prior art. This decrease in amounts added brings unforeseen effects that the curing rate of the coating increases and their strength increases without lowering of their fire resistance.

Pigments useful in inorganic coating materials of this invention include titanium oxides of rutile and anatase types, and commercially available colored inorganic or organic pigments which can be employed in a usual water-based coating material.

Useful aggregates and fillers include usual aggregates and fillers for coating material, such as ground calcium carbonate, powdery siliceous material, powdery white marble, and silica sand. The reason why amounts added of pigment, aggregate and filler are limited to the range of 2 – 20 parts by weight per one part by weight of silica sol in the binder is that difficulties arise in the course of producing the coating material or cracking is caused in the finished surface when an amount below 2 parts by weight is used, and the strength of the formed coating lowers when an amount more than 20 parts by weight is employed.

Because of employing no organic amine nor volatile nitrogenous base, the pH of silica sol is not affected, no deterioration of qualities of stabilized silica sol due to evaporation of added base is caused during storage, the stabilized sol does not gel on storage, and the sol will not gel on thawing if frozen.

Although a water-soluble melamine resin cannot form a film at room temperature and a baking usually at about 150° C is required to form a film, a film of excellent hardness can be formed at room temperature according to this invention. This special effect is caused by employing a combination of a small amount of water-soluble melamine resin and a stabilized silica sol of this invention.

In order to make a coating composition with employing a stabilized silica sol as binder according to this invention, 10 – 30% by weight of said stabilized silica sol (as standard, having silica content of 30%) are blended with 18 - 60% by weight of an aggregate or filler and a suitable amount of a pigment. To the resulted blend is further added adequate amounts of a thickener, an anti-foaming agent, or the like to modify the slurry, depending upon the applying procedure. Consequently, no organic solvent is required to prepare the coating composition. As for coating procedure, only an applying step is required. No baking step nor drying step is needed. The coating composition is composed principally of non-flammable inorganic materials and have suitable properties as coating material for applying onto inner or outer wall surfaces, especially of slate, concrete, mortar etc., in an architectural structure.

As an adsorbate having strong power for hydrogen-bond formation has been added to a silica sol, a coating composition according to this invention has effects that differences in strength among layers of coating are reduced, the adhesion strength and the curing rate increase, and the strength of coating develops early. The coating material can have decreased amounts added of organic substances as compared with those in the coating compositions of the prior art. The coating compositions of this invention can be applied by any usual applying techniques, such as spray-coating, roller-coating and brushing. On applying, the viscosity of coating composition may be adjusted by adding water or a thickener, depending on the application technique to be employed. A strong alkaline additive of the pH of 12 - 13 can be added to the one package system coating composition, as one might say, of this invention in the course of producing. By virtue of the presence of a small amount of water-soluble melamine resin, such one package system coating composition can be stable, in spite of the addition of such strong alkaline substance. As the coating composition of this invention needs no addition of an organic solvent and is composed mainly of inorganic ingredients, the composition as non-flammable coating composition is desirable for applying onto inner or outer wall surfaces, especially of slate, concrete, mortar, plywood etc., in an architectural structure. Specifically, the coating prepared by the coating composition of this invention shows a prominent behavior to cure early. Thus, the term of coating can be shortened.

This invention will be more fully understood by referring to the following illustrative examples.

EXAMPLE 1

After 100 g of a silica sol having a silica content of 30% by weight and a pH value of 8 - 10 at 25° C are introduced in a beaker, a water-soluble melamine resin and propylene glycol or triethylene glycol, as chemical additives, in amounts shown by Table 1 are added and the obtained mixture is agitated with a stirring rod until the mixture becomes homogeneous. The resulted mixture is placed in a thermo-hygrostat and changes in dispersion state of the mixture on freezing and on thawing after having been frozen are observed. Control runs are performed as in Example 1. The results obtained by four kinds of silica sol are shown in Table 1 below. The products of this invention, i.e. run Nos. 1 and 2, show excellent stabilities.

Table 1

|  | Products of this invention | | Controls | |
| --- | --- | --- | --- | --- |
| Composition, g | No. 1 | No. 2 | No. 3 | No. 4 |
| Silica sol | 100 | 100 | 100 | 100 |
| Propylene glycol | 10 | — | 10 | — |
| Triethylene glycol | — | 5 | — | 5 |
| Water-soluble melamine resin | 2 | 2 | — | — |
| Stability* | | | | |
| at −20° C (24 hrs.) | excellent | excellent | excellent | excellent |
| at −20° C (60 hrs.) | excellent | excellent | excelgelled | excelgelled |

*The word "excellent" means that the frozen sol revert to a sol after melting by being allowed to stand at 15° C.
The word "gelled" means that the frozen sol does not revert to a sol after melting by being allowed to stand at 15° C.

EXAMPLE 2

The same silica sol as in Example 1, propylene glycol, a water-soluble melamine resin and a filler are mixed in amounts shown in Table 2 below. The mixture is stirred until the whole becomes uniform. Every sample of product is applied onto a slate panel (50 mm × 150 mm) with a brush to form a coating of 1 - 1.2 mm thick. The coated panel is cured in a thermo-hygrostat maintained at 20° C, relative humidity of 80% for 7 days. Thereafter, the coating is tested by means of a penetrometer provided with a diamond needle. The coating is pressed with a load of 1.0 or 2.0 Kg for 10 seconds. The diameter of a depressed mark produced by penetration of the diamond needle into the coating is measured. The obtained results are shown in Table 2. Control runs are performed as in Example 2. The hardness of the coating is remarkably increased due to addition of a water-soluble melamine resin, as illustrated by Table 2.

Table 2

|  | Control | Product of this invention |
| --- | --- | --- |
| Composition, g | | |
| Silica sol | 100 | 100 |
| Propylene glycol | 10 | 10 |
| Water-soluble melamine resin | — | 2 |
| Filler | 500 | 500 |
| Water | 105 | 105 |
| Penetration, mm | | |
| Load of 1.0 Kg | 0.34 | 0.24 |
|  | 0.38 | 0.26 |
|  | 0.35 | 0.24 |
|  | 0.35 | 0.23 |
| Load of 2.0 Kg | 0.45 | 0.33 |
|  | 0.50 | 0.30 |
|  | 0.42 | 0.35 |
|  | 0.48 | 0.35 |

EXAMPLE 3

100 g of a silica sol (silica content of 30% by weight, pH of 9 at 25° C, particle diameter of 10 - 20 mμ) are introduced into a beaker. Propylene glycol, a water-soluble melamine resin, and an acrylic resin emulsion (resin content of 30% by weight) in amounts shown by Table 3 are added thereto as chemical additives. The mixture is agitated by a stirring rod until the whole becomes homogeneous. The resulted mixture is placed in a thermo-hygrostat and changes in dispersion state of the mixture on freezing and on thawing after having been frozen are observed. The products according to this invention, i.e. run Nos. 5 and 6, show excellent stabilities. To the modified silica sols prepared as above, are added a filler or aggregate, such as ground calcium carbonate, silica sand, or powdery white marble (size of 0.5 - 0.9 mm), and titanium oxide of rutile type as pigment, in an amount shown in Table 4. The obtained mixture is milled enough to produce a coating composition of this invention. A sample of this coating composition is applied onto a plate with a brush in an amount of 2.5 Kg per one square meter. After 7 or 14 days, a disc is sticked on the surface of the coating with an epoxy adhesive. The tensile strength of said coating is determined by pulling said disc upwards. Control runs are performed with coating compositions containing the same components as in Example 3 except water-soluble melamine resin, as shown in Table 4. It can been from the tensile test that the strength of the coating according to this invention is superior after 7 days and is remarkably superior after 14 days, as compared with controls. That is to say, the rate of hardening is higher.

Table 3

| Run No. | Products of this invention | | Controls | |
| --- | --- | --- | --- | --- |
| | No. 5 | No. 6 | No. 7 | No. 8 |
| Composition, g | | | | |
| Silica sol | 100 | 100 | 100 | 100 |
| Propylene glycol | 10 | 10 | 10 | 10 |
| Water-soluble melamine resin | 2 | 2 | — | — |
| Acrylic resin emulsion | 18 | 30 | 18 | 30 |
| Stability | | | | |
| at −20° C (24 hrs.) | excellent | excellent | excellent | excellent |
| at −20° C (60 hrs.) | excellent | excellent | gelled | gelled |

Table 4

| Run No. | Products of this invention | | Controls | |
| --- | --- | --- | --- | --- |
| | No. 5 | No. 6 | No. 7 | No. 8 |
| Composition, g | | | | |
| Silica sol | 100 | 100 | 100 | 100 |
| Propylene glycol | 10 | 10 | 10 | 10 |
| Water-soluble melamine resin | 2 | 2 | — | — |
| Acrylic resin emulsion | 18 | 30 | 18 | 30 |
| Filler, pigment | 600 | 600 | 600 | 600 |
| Water | 32 | 35 | 37 | 40 |
| Tensile strength, Kg/cm² | | | | |
| after 7 days | 9.8 | 12.8 | 6.4 | 7.8 |
| after 14 days | 11.2 | 14.6 | 7.4 | 8.5 |

0.5 g of a thickener "Natolsol" and 20 g of water are added to the product No. 5 in Table 4 of this invention to form a paste. 1 g of "Natolsol" and 40 g of water is added to the product No. 6 in Table 4 of this invention to form a paste. Employing hand rollers made of porous material, both pastes are applied onto the surfaces of precast concrete boards at a rate of 1.5 Kg/m². The drape of both pastes to the surface of roller is good. The directional property of brush marks disappear. Flat final surfaces are obtained with covered pinholes and mild undulations.

EXAMPLE 4

A coating composition which has been formulated according to Table 5 is prepared for spray coating. Although a strong alkaline waterproofing agent of pH 13 is mixed, the composition is stable and no gelling can be seen. A precast board is spray coated at a rate of 1.3 Kg/m² under a pressure of 4 Kg/cm² by means of a spray gun having a nozzle of diameter of 5 mm. The adhesion of the formed coating to the substrate is strong, and the water resistance and the fire resistance of the coating are excellent.

Table 5

| | Product of this invention |
| --- | --- |
| Composition, g | |
| Silica sol | 100 |
| Water-soluble melamine resin | 2 |
| Acrylic resin emulsion | 10 |
| Propylene glycol | 20 |
| Titanium oxide of rutile type | 20 |
| Ground calcium carbonate | 350 |
| Coarse calcium carbonate | 250 |
| Powdery white marble | 600 |
| Silica sand | 400 |
| Thickener | 0.5 |
| Waterproofing agent | 5 |
| Water | 150 |

What is claimed is:

1. Method for producing an inorganic coating composition which comprises forming a binder component consisting of a stable silica sol and incorporating said binder into said inorganic coating composition, said stable silica sol being prepared by adding at least one dihydric long chain alcohol having 3 or more carbon atoms to a silica sol, and adding a water-soluble melamine resin to the resultant sol.

2. An inorganic coating composition consisting essentially of a stable silica sol, as binder, which is prepared by adding at least one dihydric long chain alcohol having at least 3 carbon atoms, a small amount of a water-soluble melamine resin and an acrylic resin emulsion, to a silica sol having a silica content of about 30% by weight; a mixture of pigment, aggregate and filler in a quantity corresponding to a weight ratio of said silica sol to said mixture of 1 : 2–20; usual additives for coating material in a suitable quantity; and water.

3. The composition of claim 2, in which said dihydric long chain alcohol having at least 3 carbon atoms is used in a quantity of at least 5 parts by weight per 100 parts by weight of said silica sol having a silica content of about 30% by weight, said water-soluble melamine resin is used in a quantity of at least 2 parts by weight per 100 parts by weight of said silica sol, and said acrylic resin emulsion has the resin content of about 30% by weight and is used in a quantity of 10 – 35 parts by weight per 100 parts by weight of said silica sol.

4. The method of claim 1, in which said dihydric long chain alcohol having at least 3 carbon atoms is selected from the group consisting of propylene glycol, trimethylene glycol and triethylene glycol.

5. The composition of claim 3, in which said dihydric long chain alcohol having at least 3 carbon atoms is selected from the group consisting of propylene glycol, trimethylene glycol and triethylene glycol.

6. The method of claim 1, in which said water-soluble melamine resin is a methyl-etherified product of melamine-formaldehyde precondensate which is prepared by a process wherein melamine is reacted at a low temperature under alkaline conditions with formaldehyde to obtain a methylol derivative of high methylol content, and then said methylol derivative is etherified under weak acidic condition with methanol.

7. The composition of claim 3, in which said water-soluble melamine resin is a methyl-etherified product of melamine-formaldehyde precondensate which is prepared by a process wherein melamine is reacted at low temperature under alkaline conditions with formaldehyde to obtain a methylol derivative of high methylol content, and then said methylol derivative is etherified under weak acidic condition with methanol.

8. The composition of claim 3, in which said acrylic resin emulsion is an emulsion of an acrylic resin which is prepared by emulsion-polymerizing, as main monomer, one or more kinds of monomer selected from the group consisting of acrylic acid, methacrylic acid,, fumaric acid, crotonic acid, itaconic acid and esters of these acids.

9. Method for preparing a stable silica sol which comprises providing 100 parts by weight of a silica sol having a silica content of about 30% by weight, adding thereto at least one dihydric long chain alcohol having at least 3 carbon atoms in a quantity of at least 5 parts by weight, and further adding a water-soluble melamine resin in a quantity of at least 2 parts by weight to the resulted sol.

10. The method of claim 9, in which said dihydric long chain alcohol having at least 3 carbon atoms is selected from the group consisting of propylene glycol, trimethylene glycol and triethylene glycol.

11. The method of claim 9, in which said water-soluble melamine resin is a methyl-etherified product of melamine-formaldehyde precondensate which is prepared by a process wherein melamine is reacted at low temperature under alkaline condition with formaldehyde to obtain a methylol derivative of high methylol content, and then said methylol derivative is etherified under weak acidic condition with methanol.

12. Method for preparing a stable silica sol which comprises providing 100 parts by weight of a silica sol having a silica content of about 30% by weight, adding thereto at least one dihydric long chain alcohol having at least 3 carbon atoms in a quantity of at least 5 parts by weight, and further adding a water-soluble melamine resin in a quantity of at least 2 parts by weight, together with an acrylic resin emulsion having a resin content of about 30% by weight in a quantity of 10-35 parts by weight, to the resultant sol.

13. The method of claim 12, in which said dihydric long chain alcohol having at least 3 carbon atoms is selected from the group consisting of propylene glycol, trimethylene glycol and triethylene glycol.

14. The method of claim 12, in which said water-soluble melamine resin is a methyl-etherified product of melamine-formaldehyde precondensate which is prepared by a process wherein melamine is reacted at a low temperature under alkaline conditions with formaldehyde to obtain a methylol derivative of high methylol content, and then said methylol derivative is etherified under weak acidic conditions with methanol.

15. The method of claim 12, in which said acrylic resin emulsion consists essentially of an emulsion of an acrylic resin which is prepared by emulsion-polymerizing, as main monomer, at least one monomer selected from the group consisting of acrylic acid, methacrylic acid, fumaric acid, crotonic acid maleic acid, itaconic acid and esters of these acids.

* * * * *